United States Patent
Lee

(10) Patent No.: US 6,640,683 B2
(45) Date of Patent: Nov. 4, 2003

(54) APPARATUS FOR CLAMPING A WORKPIECE-BLOCKING PLATE OF A TABLE SAW

(75) Inventor: Jackie Lee, Taichung (TW)

(73) Assignee: P&F Brother Industrial Corporation (TW)

( * ) Notice: Subject to any disclaimer, the term of this patent is extended or adjusted under 35 U.S.C. 154(b) by 184 days.

(21) Appl. No.: 10/029,588

(22) Filed: Oct. 25, 2001

(65) Prior Publication Data

US 2003/0079592 A1 May 1, 2003

(51) Int. Cl.⁷ .............................................. B23D 19/00
(52) U.S. Cl. ........................................ 83/477.2; 83/446
(58) Field of Search ................... 269/318; 83/477.2, 83/438, 446; D15/133

(56) References Cited

U.S. PATENT DOCUMENTS

| | | | | |
|---|---|---|---|---|
| 4,516,612 A | * | 5/1985 | Wiley | 83/438 |
| 4,848,203 A | * | 7/1989 | Brooks | 83/438 |
| 5,174,349 A | * | 12/1992 | Svetlik et al. | 83/477.2 |
| D354,757 S | * | 1/1995 | Wixey | D15/133 |
| 5,460,070 A | * | 10/1995 | Buskness | 83/438 |
| D377,654 S | * | 1/1997 | Jedlicka et al. | D15/133 |
| 5,619,896 A | * | 4/1997 | Chen | 83/477.2 |
| D411,090 S | * | 6/1999 | Chang | D15/133 |
| D425,529 S | * | 5/2000 | Svetlik | D15/133 |
| D437,605 S | * | 2/2001 | Schoene et al. | D15/133 |
| D458,947 S | * | 6/2002 | Svetlik et al. | D15/133 |
| D461,833 S | * | 8/2002 | Gist et al. | D15/133 |
| D466,913 S | * | 12/2002 | Ceroll et al. | D15/133 |
| 6,539,831 B2 | * | 4/2003 | Huang | 83/477.2 |

* cited by examiner

Primary Examiner—Allan N. Shoap
Assistant Examiner—Jason Prone
(74) Attorney, Agent, or Firm—Trop, Pruner & Hu, P.C.

(57) ABSTRACT

A clamping apparatus for clamping a workpiece-blocking plate of a table saw includes a mounting member attached to a machine base, and a retaining plate mounted pivotally on the mounting member. The retaining plate has an L-shaped plate portion that supports the workpiece-blocking plate thereon and that is biased to press the workpiece-blocking plate against the mounting member. When the workpiece-blocking plate is removed from the apparatus, the retaining plate can be turned to a storage position, where the retaining plate is disposed within a notch in the mounting member and where the L-shaped plate portion is disposed within an L-shaped notch portion of the notch.

5 Claims, 7 Drawing Sheets

APPARATUS FOR CLAMPING A WORKPIECE-BLOCKING PLATE OF A TABLE SAW

BACKGROUND OF THE INVENTION

1. Field of the Invention

This invention relates to a table saw, and more particularly to a clamping apparatus for clamping a workpiece-blocking plate of a table saw when the plate is not in use.

2. Description of the Related Art

Referring to FIG. 1, a conventional table saw is shown to include a machine base 10, a table 11 that is fixed on the base 10, and a workpiece-blocking plate 12 that is disposed movably on the table 11 for abutment of a wooden workpiece (not shown) to be cut. A mounting member 13 is attached to a side of the base 10, and is formed with a positioning groove 14. When it is desired to transport or store the table saw, the plate 12 is removed from the table 11, and is subsequently put into the positioning groove 14 in the mounting member 13. However, the plate 12 may drop from the mounting member 13 when the table saw is moved.

SUMMARY OF THE INVENTION

The object of this invention is to provide a clamping apparatus for clamping a workpiece-blocking plate of a table saw when the plate is not in use.

According to this invention, a clamping apparatus for clamping a workpiece-blocking plate of a table saw includes a mounting member attached to a machine base, and a retaining plate mounted pivotally on the mounting member. The retaining plate has an L-shaped plate portion that supports the workpiece-blocking plate thereon and that is biased to press the workpiece-blocking plate against the mounting member. When the workpiece-blocking plate is removed from the apparatus, the retaining plate can be turned to a storage position, where the retaining plate is disposed within a notch in the mounting member and where the L-shaped plate portion is disposed within an L-shaped notch portion of the notch.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
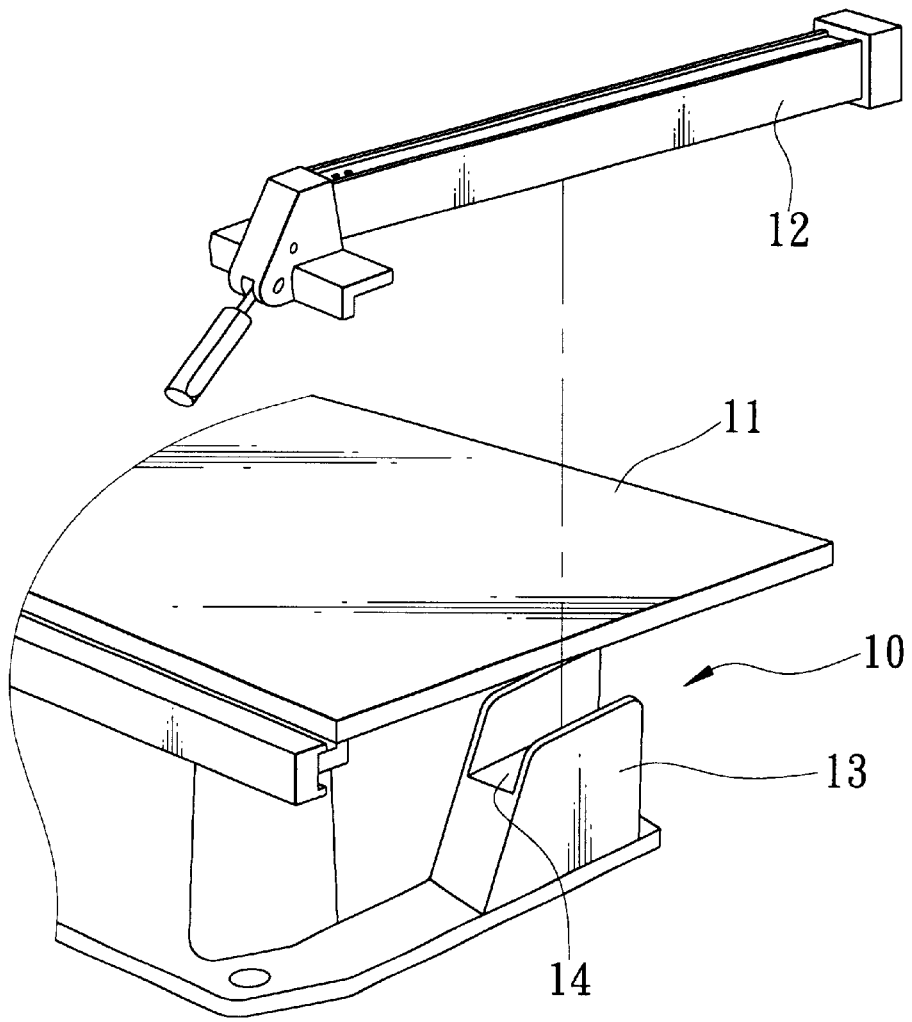
FIG. 1 is a partly exploded fragmentary perspective view of a conventional table saw.
Figure 2:
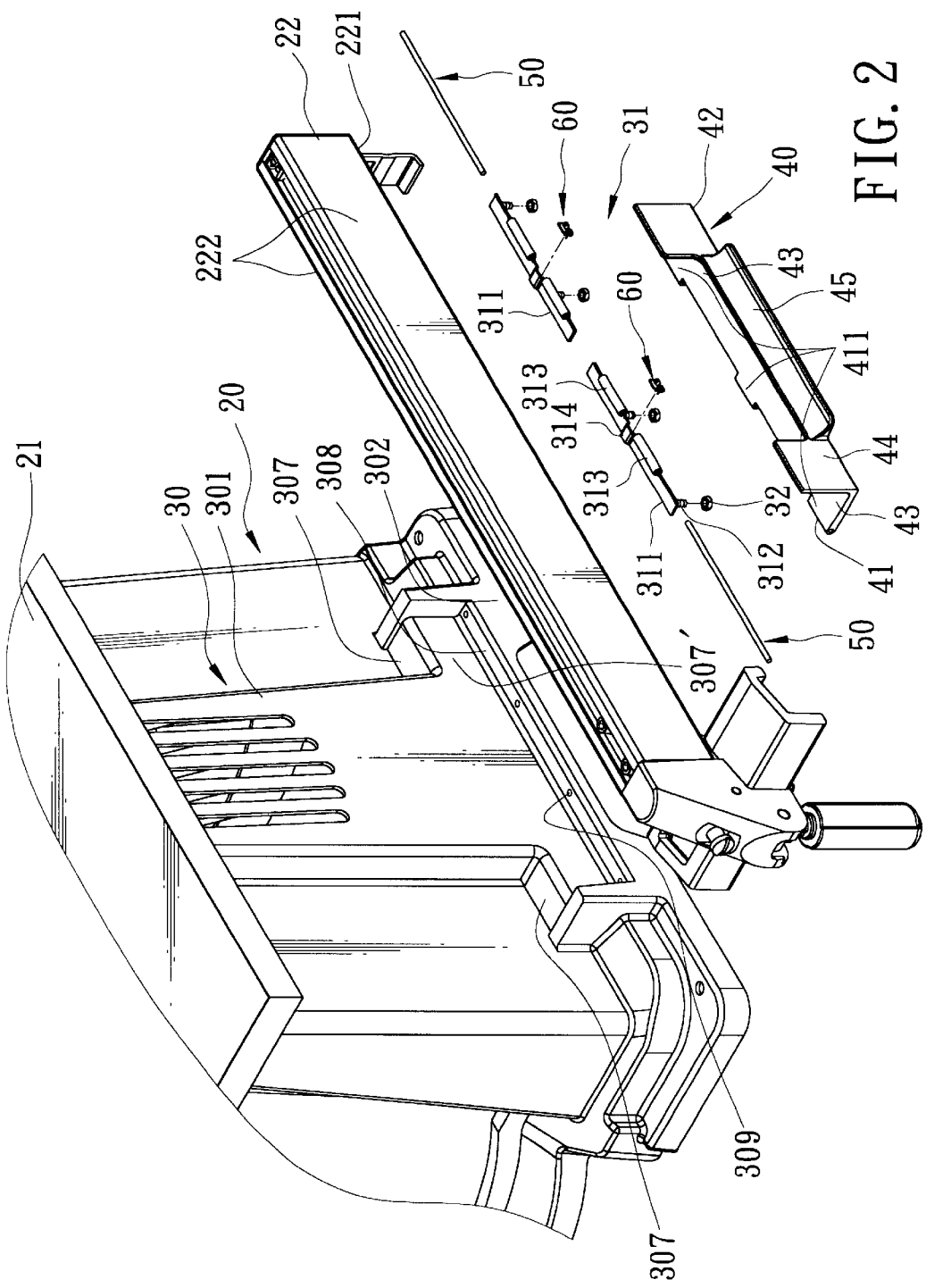
FIG. 2 is an exploded perspective view of the preferred embodiment of a clamping apparatus for clamping a workpiece-blocking plate of a table saw according to this invention.
Figure 3:
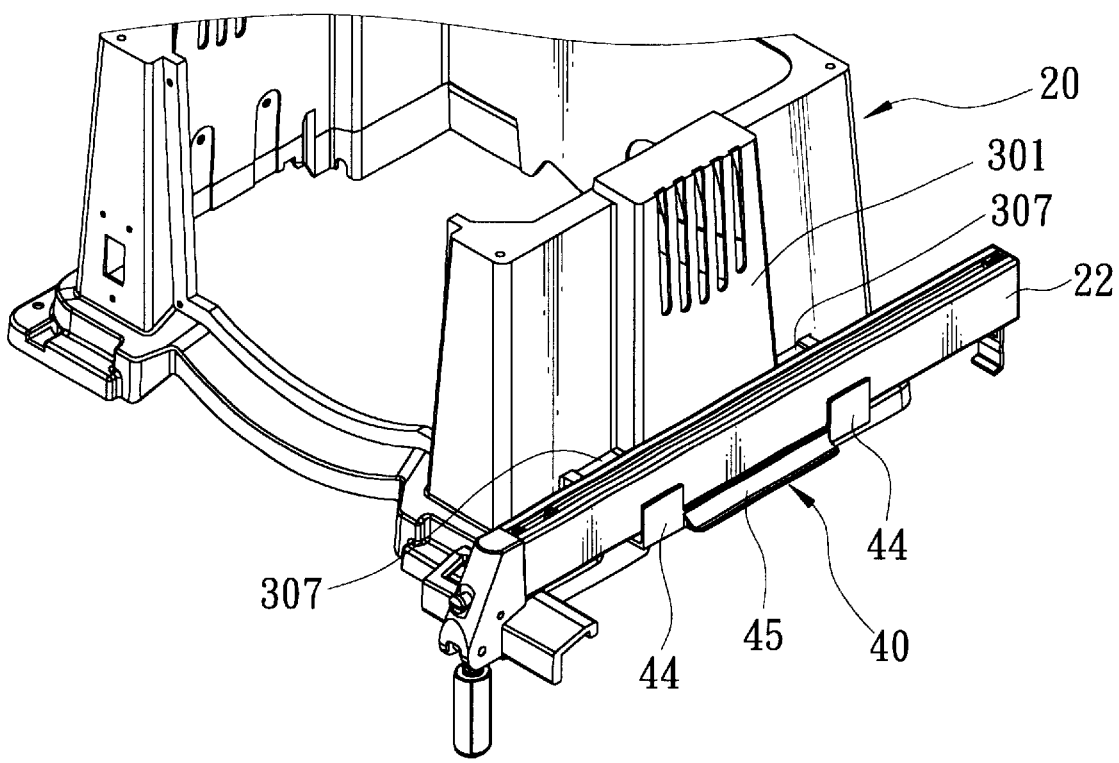
FIG. 3 is an assembled perspective view of the preferred embodiment, in which the workpiece-blocking plate is removed from the apparatus.
Figure 4:
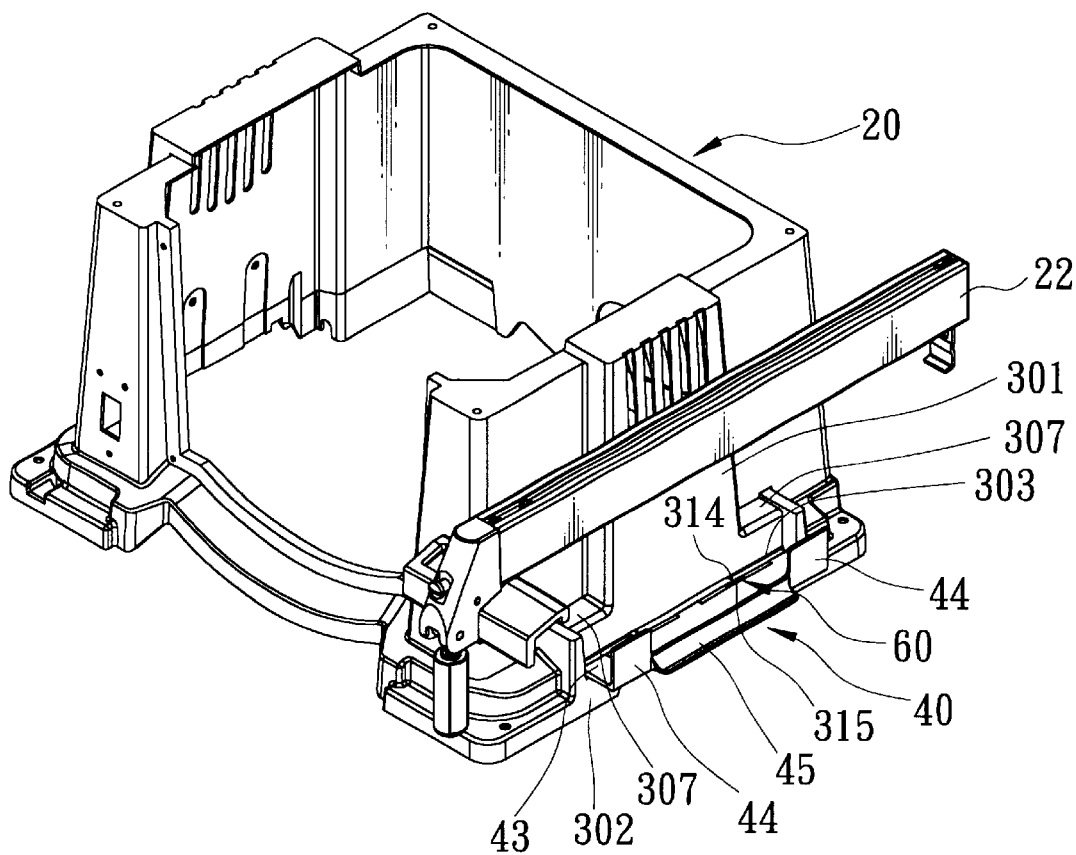
FIG. 4 is an assembled perspective view of the preferred embodiment, in which the workpiece-blocking plate is clamped by the apparatus.
Figure 4A:
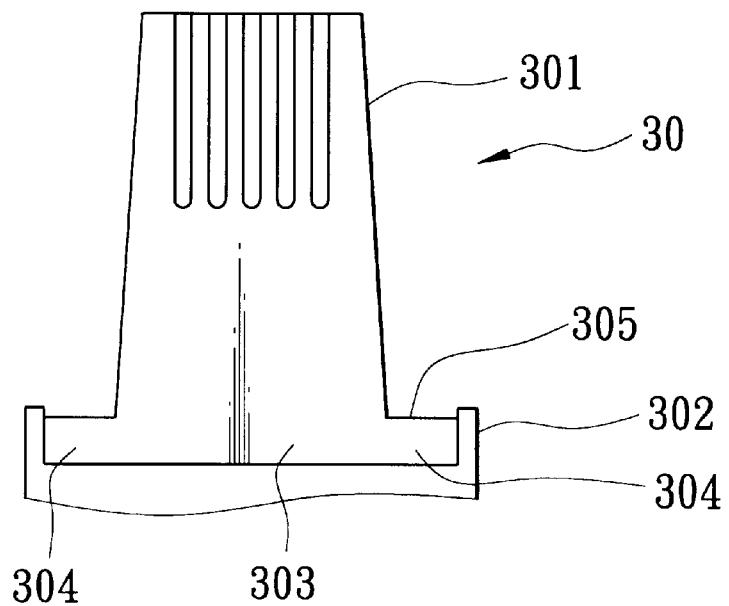
FIG. 4A is a schematic front view of an inverted T-shaped portion and a U-shaped portion of a mounting member of the preferred embodiment, illustrating a storage notch that is formed in the mounting member.
Figure 4B:
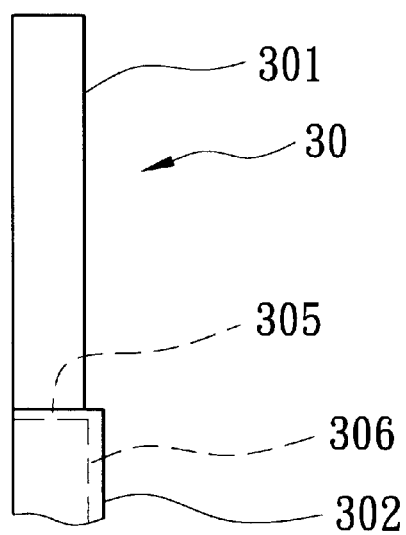
FIG. 4B is a schematic side view of the inverted T-shaped portion and the U-shaped portion of the mounting member of the preferred embodiment, illustrating an L-shaped notch portion of the notch.

Referring to FIGS. 2, 3, 4, 4A and 4B, the preferred embodiment of a clamping apparatus for clamping a workpiece-blocking plate 22 of a table saw is shown to include a mounting member 30 and an elongated unitary retaining plate 40. The table saw has a machine base 20 and a table 21. The workpiece-blocking plate 22 is disposed movably on the table 21 in a known manner for abutment of a wooden workpiece (not shown) to be cut, and has a horizontal bottom surface 221 and two opposite vertical side surfaces 222.

The mounting member 30 is disposed fixedly on a side of the machine base 22, and has an inverted T-shaped upper portion 301 and a U-shaped lower portion 302, which define a storage notch 303 that has a shape generally complementary to the retaining plate 40, and first and second L-shaped notch portions 304 at two opposite sides of the notch 303. Each of the first and second L-shaped notch portions 304 consists of a clamp-storing portion 305 and a support-storing portion 306. The inverted T-shaped upper portion 301 is formed with two horizontal clamp-supporting surfaces 307 that define the lower ends of the clamp-storing portions 305 of the notch 303, and a vertical support-engaging surface 307' that defines the support-storing portions 306 of the notch 303. The U-shaped lower portion 302 is formed with a horizontal mounting surface 308 that defines the lower ends of the support-storing portions 306 of the notch 303.

The mounting member 30 is provided with a removable hinge sleeve unit 31 that is bolted on the mounting surface 308. The retaining plate 40 is formed with an integral hinge sleeve unit 41. A hinge pin unit consists of two pins 50, and extends through the removable hinge sleeve unit 31 of the mounting member 30 and the integral hinge sleeve unit 41 of the retaining plate 40, thereby permitting rotation of the retaining plate 40 about the pins 50. The removable sleeve unit 31 includes two aligned mounting strips 311, each of which has a bottom surface with two integral threaded posts 312 that extend through two holes 309 in the mounting member 30 to engage two nuts 32 so as to fix the mounting strips 311 on the mounting surface 308, an outer side with two aligned sleeves 313, and a curved middle strip portion 314 that defines a spring-clamping space 315 between the curved middle strip portion 314 and the horizontal mounting surface 308.

Figure 5:
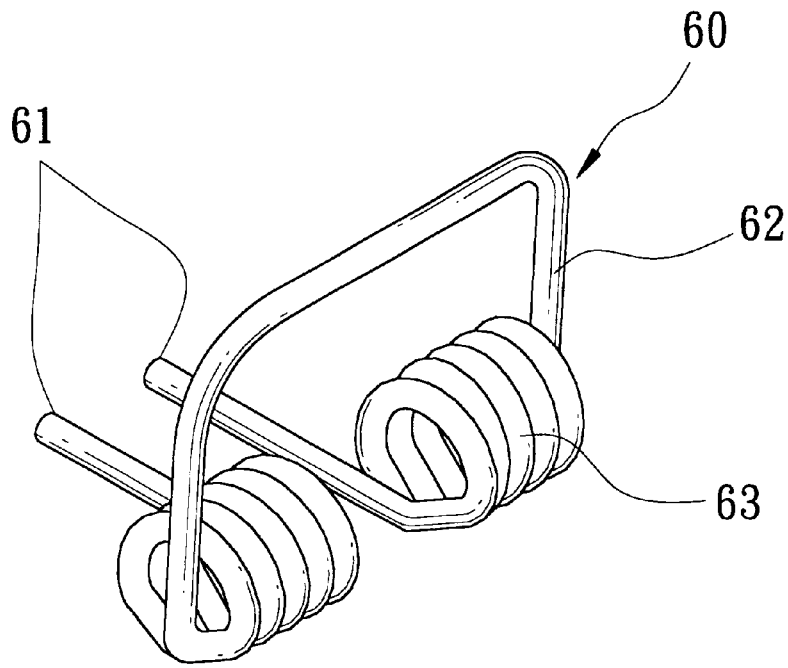
FIG. 5 is a perspective view of a torsion spring of the preferred embodiment.
Figure 6:
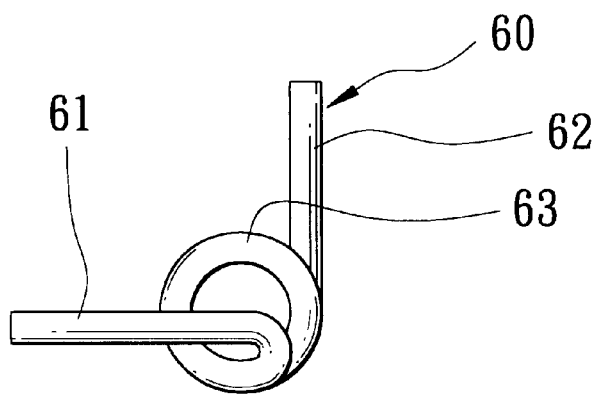
FIG. 6 is a schematic side view of the torsion spring of the preferred embodiment.

A torsion spring unit is disposed between the mounting member 30 and the retaining plate 40 so as to bias the retaining plate 40 to turn upward relative to the mounting member 30, thereby pressing the workpiece-blocking plate 22 against the mounting member 30. In this embodiment, the torsion spring unit includes two torsion springs 60, each of which has two parallel insert ends 61 (see FIGS. 5 and 6) that are inserted into the corresponding spring-clamping space 315, an inverted U-shaped pressing portion 62 (see FIGS. 5 and 6) that abuts against the retaining plate 40 and that is perpendicular to the insert ends 61, and two coiled portions 63 (see FIGS. 5 and 6) for connecting respectively and fixedly two ends of the inverted U-shaped portion 62 (see FIGS. 5 and 6) to the insert ends 61 (see FIGS. 5 and 6).

The integral hinge sleeve unit 41 consists of three aligned sleeves 411. The retaining plate 40 has first and second L-shaped plate portions 42 at two opposite ends thereof, each of which includes a horizontal supporting portion 43 that is formed integrally with the sleeves 411 and that permits abutment of the bottom surface 221 of the workpiece-blocking plate 22 thereon, and a vertical clamping portion 44 that is biased to press against one of the side surfaces 222 of the workpiece-blocking plate 22 by the torsion springs 60, thereby clamping the workpiece-blocking plate 22 between the mounting member 30 and the clamping portions 44 of the first and second L-shaped plate portions 42 of the retaining plate 40. An actuator plate portion 45 is formed on the retaining plate 40 between the clamping portions 44, and extends from the clamping portions 44 in a direction which is opposite to that of the supporting portions 43.

Figure 7:
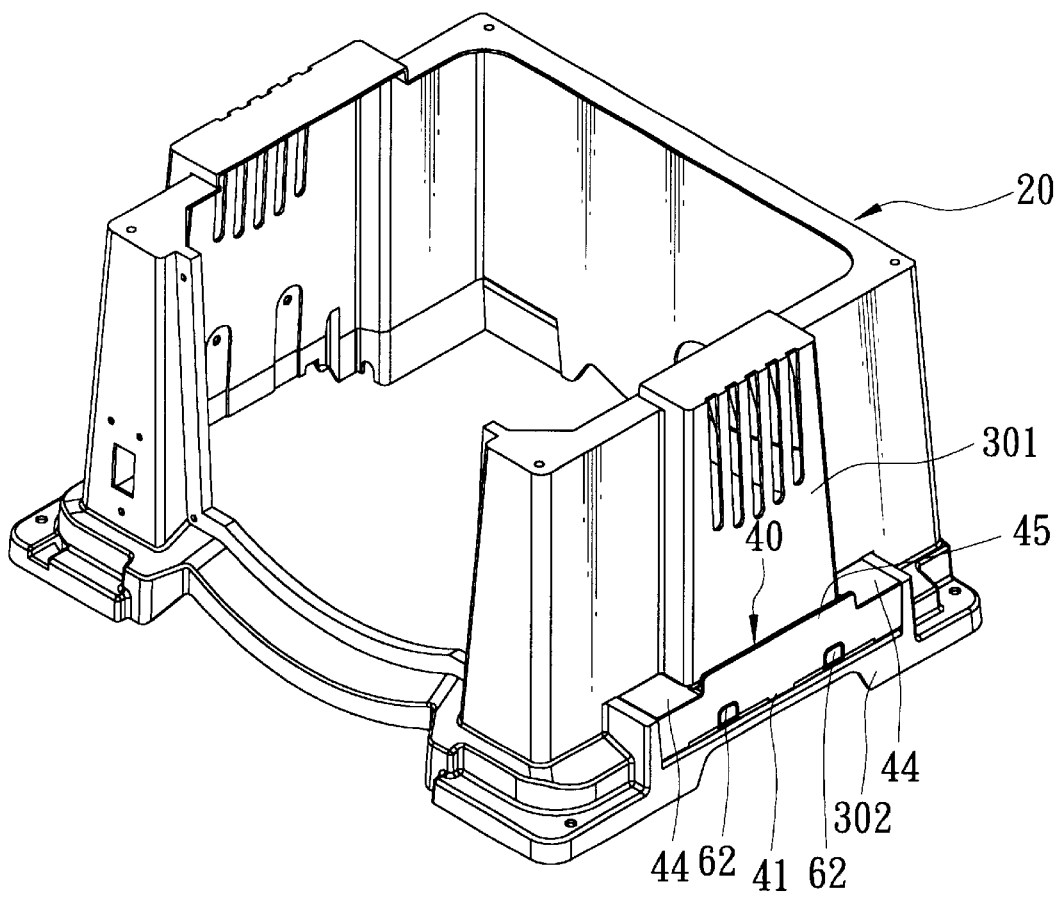
FIG. 7 is an assembled perspective view of the preferred embodiment and a machine base of the table saw when a retaining plate is disposed at a storage position.

When it is desired to cut the workpiece (not shown), the workpiece-blocking plate 22 is removed forcibly from the apparatus against the biasing action of the torsion springs 60, and is subsequently mounted on the table 21 of the table saw. Under such conditions, by turning the actuator plate portion 45 upward, the retaining plate 40 can be rotated relative to the mounting member 30 from the position shown in FIG. 4 to a storage position shown in FIG. 7, where the retaining plate 40 is disposed within the notch 303 in the mounting member 30, where the supporting portions 43 of the retaining plate 40 are disposed respectively within the support-storing portions 306 of the notch 303, and where the clamping portions 44 of the retaining plate 40 are disposed respectively within the clamp-storing portions 305 of the notch 303 and are supported respectively on the clamp-supporting surfaces 307 of the mounting member 30, thereby positioning the retaining plate 40 on the mounting member 30 and resulting in an aesthetic appearance for the apparatus.

With this invention thus explained, it is apparent that numerous modifications and variations can be made without departing from the scope and spirit of this invention. It is therefore intended that this invention be limited only as indicated by the appended claims.

I claim:

1. A clamping apparatus adapted to clamp a workpiece-blocking plate of a table saw, the table saw including a machine base, on which the workpiece-blocking plate is mounted removably, the blocking plate having a bottom surface and two opposite side surfaces and being capable of being removed from the machine base when not in use, said clamping apparatus comprising:

a mounting member adapted to be attached to the machine base and having a storage notch and a generally horizontal first clamp-supporting surface, said notch including a first L-shaped notch portion, which has a clamp-storing portion and a support-storing portion, said clamp-storing portion of said notch having a lower end that is defined by said first clamp-supporting surface; and a retaining plate having a first L-shaped plate portion, which includes a generally horizontal supporting portion that is disposed pivotally on said mounting member and that is adapted to permit abutment of the bottom surface of the workpiece-blocking plate thereon, and a generally vertical clamping portion that is adapted to be biased to press against one of the side surfaces of the workpiece-blocking plate, thereby clamping the workpiece-blocking plate between said mounting member and said clamping portion of said first L-shaped plate portion of said retaining plate, said retaining plate being rotatable relative to said mounting member to a storage position, where said retaining plate is disposed within said notch, where said supporting portion of said first L-shaped plate portion of said retaining plate is disposed within said support-storing portion of said first L-shaped notch portion of said notch in said mounting member, and where said clamping portion of said first L-shaped plate portion is disposed within said clamp-storing portion of said first L-shaped notch portion and is supported on said first clamp-supporting surface of said mounting member, thereby positioning said retaining plate on said mounting member.

2. The clamping apparatus as claimed in claim 1, wherein said notch in said mounting member further includes a second L-shaped notch portion, which has a clamp-storing portion and a support-storing portion, said mounting member further having a generally horizontal second clamp-supporting surface, said clamp-storing portion of said second L-shaped notch portion having a lower end that is defined by said second clamp-supporting surface, said retaining plate being elongated and further having an actuator plate portion, and a second L-shaped plate portion, which includes a generally horizontal supporting portion that is disposed pivotally on said mounting member and that is adapted to permit abutment of the bottom surface of the workpiece-blocking plate thereon, and a generally vertical clamping portion that is adapted to be biased to press against the one of the side surfaces of the workpiece-blocking plate, thereby clamping the workpiece-blocking plate between said mounting member and said clamping portion of said second L-shaped plate portion of said retaining plate, said first and second L-shaped plate portions being located at two opposite ends of said retaining plate, said actuator plate portion being capable of being actuated to rotate said retaining plate to said storage position, where said second L-shaped plate portion of said retaining plate is disposed within said second L-shaped notch portion of said notch in said mounting member and where said clamping portion of said second L-shaped plate portion is supported on said second clamp-supporting surface of said mounting member.

3. The clamping apparatus as claimed in claim 1, wherein said mounting member is provided with a removable hinge sleeve unit that is bolted thereon, said retaining plate being formed with an integral hinge sleeve unit, said apparatus further including a hinge pin unit that extends through said removable hinge sleeve unit of said mounting member and said integral hinge sleeve unit of said retaining plate, thereby permitting rotation of said retaining plate about said hinge pin unit.

4. The clamping apparatus as claimed in claim 3, further comprising a torsion spring unit that is disposed between said mounting member and said retaining plate so as to bias said retaining plate to rotate on said mounting member, thereby pressing the workpiece-blocking plate against said mounting member.

5. The clamping apparatus as claimed in claim 4, wherein said mounting member has a horizontal mounting surface that defines a lower end of said support-storing portion of said first L-shaped notch portion, said removable hinge sleeve unit including a mounting strip bolted on said mounting surface of said mounting member and having a curved strip portion so as to define a spring-clamping space between said curved strip portion and said horizontal mounting surface, said torsion spring unit including a torsion spring, which has two parallel insert ends that are inserted into said spring-clamping space, an inverted U-shaped pressing portion that abuts against said retaining plate and that is perpendicular to said insert ends, and two coiled portions for connecting respectively and fixedly two ends of said inverted U-shaped portion to said insert ends.

* * * * *